June 18, 1940.  M. D. SANDERS  2,204,703
TREATMENT OF WASTES
Filed Nov. 9, 1936
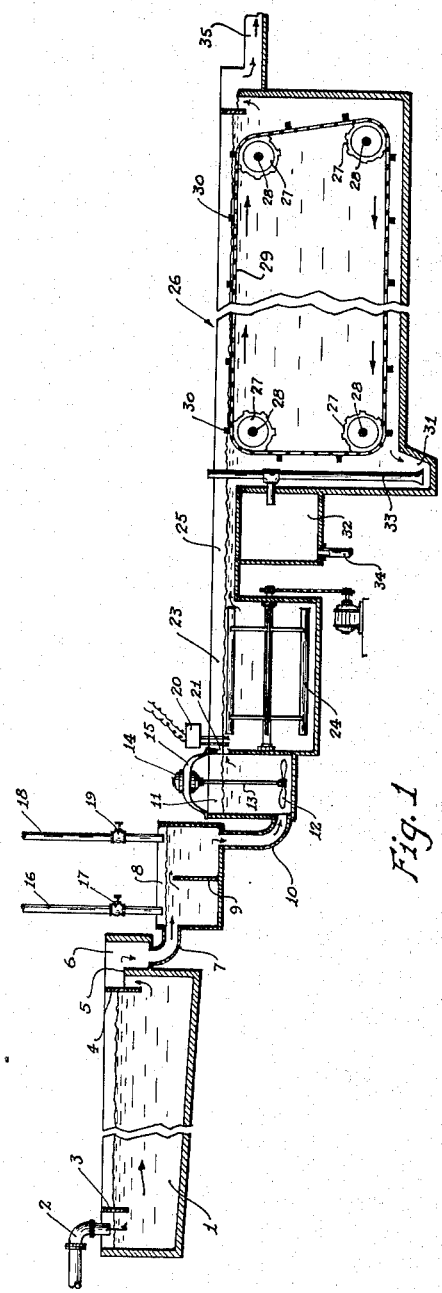
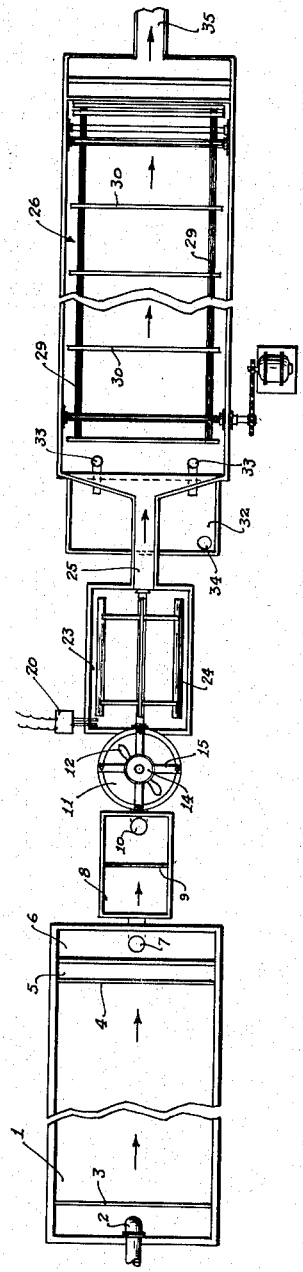
Marion D. Sanders
INVENTOR
ATTEST
BY
ATTORNEY Patented June 18, 1940

2,204,703

UNITED STATES PATENT OFFICE 2,204,703

TREATMENT OF WASTES

Marion D. Sanders, Chicago, Ill., assignor to Industrial Patents Corporation, Chicago, Ill., a corporation of Delaware Application November 9, 1936, Serial No. 110,007

13 Claims. (Cl. 260—112)

This invention relates to the treatment of dilute wastes for the recovery of fatty and protein values.

One of the objects of the invention is to provide a method for the treatment of sewage.

Another object of the invention is to provide a method for the treatment of fluids containing proteins.

Other objects of the invention will be apparent from the description and claims which follow.

Divers methods have been proposed from time to time for the treatment of sewage in order to remove a sufficient quantity of solids from sewage to permit discharge of the water into streams without danger of pollution.

One method in general use for the treatment of municipal sewage, high in household wastes, may be termed the wet oxidative method in which the putrescible substances in the sewage are destroyed by bacterial action in appropriate vessels such as aeration tanks or bacteria beds such as trickling filters. The wet oxidative method is the generally accepted method for the treatment of sewage.

Attempts have been made from time to time to employ chemical methods for the removal of putrescible substances in sewage. Chemical methods generally have the advantage of requiring a less investment in plant, but have the disadvantage of high operating cost by reason of the cost of the reagents. Consequently, the chemical methods have been little used. It will also be apparent that chemical methods do not result in a relatively pure effluent such as must be discharged by municipal sewage treatment plants treating large quantities of sewage.

Although the method of the present invention is operative with various types of sewage, its peculiar utility is manifest in the case of industrial wastes relatively high in solids content.

By way of illustration, but not by way of limitation, the invention will be described as carried out with packing house wastes.

In ordinary practice there are three types of sewage or wastes produced in the packing plant. The usual sanitary sewage is discharged to the sanitary sewers. That is not considered a packing house waste. To the sanitary sewage is ordinarily added the effluent from the manure screens. The intestinal contents removed from slaughtered animals is normally passed through a separate conduit to screen out the solids, permitting the effluent to pass to the sanitary sewage system. The third class of packing house wastes is the bulk of the material and consists of water which has been used for washing and in various operations incident to the slaughter and dressing of carcasses. This water is rich in various proteins and fats, including blood, serums, tissue and grease and is conventionally passed to a skimming basin where the floating grease is recovered for such uses as soap making. The remaining material, which normally includes approximately from 2,000 to 5,000 parts per million of suspended and dissolved solids, is discharged to the sewers and finds its way directly to a stream or to a municipal sewage treatment plant.

Packing house waste waters normally have a biochemical oxygen demand of 500 to 2,000 parts per million. River water which has not been polluted is normally saturated with oxygen and contains, depending upon temperature, from 5 to 7 parts per million.

It is generally considered that an oxygen content of less than 2½ parts per million renders water dangerous to marine life. Consequently, any substantial pollution of river water with raw wastes having a relatively high biochemical oxygen demand tends to reduce the oxygen content of the stream to a point dangerous to marine life. It is readily apparent, therefore, that to avoid stream pollution it is desirable to sufficiently treat or dilute industrial wastes to prevent an excessive biochemical oxygen demand in the stream. From the standpoint of stream pollution it is often entirely unnecessary to provide any treatment of packing house wastes other than the ordinary dilution incident to plant operations.

The present invention lends itself effectively to the treatment of wastes where conditions indicate necessity of reducing the biochemical oxygen demand of the effluent delivered to a stream.

The present invention is also adapted to the treatment of all packing house wastes irrespective of the question of stream pollution for the recovery of valuable solids in the wastes.

The present invention is based upon the discovery that the coalescence of finely divided solids in wastes into aggregates of settleable size by the use of such reagents as ferric chloride, for example, to bring about the maximum recovery of such solids reaches its optimum with an acid pH of approximately 4.8.

I have found in practice that satisfactory results may be secured with varying wastes in the pH range from approximately 4.0 to 5.5.

The present invention will be more readily understood by reference to the drawing in which similar characters of reference in the several figures indicate similar parts.

Figure 1 is a schematic side view of equipment for carrying out the process of the present invention.

Figure 2 is a schematic plan view of the equipment shown in Figure 1.

The waste is received in skimming basin 1 through pipe 2, turbulence in the skimming basin being minimized by baffle plate 3. Any desired means may be employed for skimming grease from the surface of the liquid in skimming basin 1. In the ordinary installation manual skimming at intervals is sufficient. The waste flows through skimming basin 1 under skimming baffle 4 over effluent weir 5 through box 6, thence through pipe 7 into weirbox 8 provided with weir 9 to measure the rate of flow through weirbox 8. The liquid passes from weirbox 8 through pipe 10 into mixer 11. Any suitable mixer may be employed, a baffled mixing channel being adequate for a low capacity installation.

In the drawing is shown a preferred mixer in which agitator blades 12 mounted upon shaft 13 are driven by motor 14 mounted on frame 15.

The chemical reagents are added to the liquid at any desired point between the skimming basin 1 and mixer 11.

In the drawing I have shown inlet pipe 16 for the introduction of a reagent such as ferric chloride into weirbox 8. Inlet pipe 16 may be provided with valve 17. Inlet pipe 18, which may be provided with valve 19, admits a mineral acid, preferably sulphuric acid, to weirbox 8. The introduction of sulphuric acid through pipe 18 may be controlled by manual means or in any other desired manner.

In the drawing I have shown a pH controller 20 mounted at the discharge 21 of the mixer 11.

The desired pH may be maintained by connecting the mechanism of the pH controller to a valve in pipe 18, permitting the flow of acid to be varied in accordance with the pH of liquid as it passes from the mixer.

The liquid with which the desired reagents have been thoroughly mixed in mixer 11 passes through discharge 21 into flocculator 23 provided with slowly revolving paddles 24. It will be understood that any desired flocculating equipment may be employed. The liquid is gently agitated in the flocculator 23 and consumes sufficient time in passing through the flocculator to permit the desired degree of coagulation of protein solids forming flocs which, in addition to proteins, entrap and contain other solid material including residual grease. The floc-bearing liquid passes from flocculator 23 through pipe 25 to settling tank 26 which may be provided with any desired continuous sludge removing mechanism. In the settling tank shown in the drawing, sprockets 27 mounted on suitable shafts 28 carry chains 29 provided with scrapers 30 which propel settled solids to sludge hopper 31 from which the sludge is pumped as to sludge pit 32 through pipe 33. The sludge may be removed from sludge pit 32 through pipe 34.

The effluent, after settling, is discharged through effluent discharge 35.

It will be understood that the foregoing description of the apparatus depicted in the drawing is illustrative and that the process of the present invention may be performed with any desired equipment.

The process of the present invention is a complete process for the treatment of wastes of the character of packing house or slaughter house wastes. The process involves the initial removal of grease from the waste. It is not necessary that grease removal be complete, but it is desirable in carrying out the subsequent steps of the process that the quantity of grease in the wastes be reduced to a practicable minimum before flocculation because of the tendency of excess quantities of grease to interfere with the final settling of the sludge. The substantially degreased waste is then treated with a coagulant and the pH adjusted to from 4.0 to 5.5, preferably to the optimum pH for flocculation, which, as has already been pointed out, is about 4.8. A preferred coagulant is ferric chloride. I have found in practice that many of the polyvalent metallic salts are effective, for example, aluminum sulphate, thorium nitrate, and aluminum chloride. The preferred acid is sulphuric acid although any other substance which will adjust the pH to the desired point will be effective.

The effect of pH on flocculation and settling will be readily appreciated by reference to the following tables showing the relation of pH to biochemical oxygen demand removal based upon the use of 300 pounds of ferric chloride per million gallons of waste treated.

Table A gives the results of large scale tests employing continuous settling with an average detention period of one hour and twenty minutes.

Table B gives the results of quiescent settling for 1½ hours in small scale laboratory tests.

Table A

| pH | Per cent reduction bio-chemical oxygen demand |
| --- | --- |
| 4.3 | 44 |
| 4.6 | 53.5 |
| 4.8 | 65.7 |
| 5.2 | 46 |

Table B

| pH | Per cent reduction bio-chemical oxygen demand |
| --- | --- |
| 3.6 | 60. |
| 4.6 | 77. |
| 5.8 | Floc so slow to form, did not analyze. |

Using the preferred reagents, ferric chloride and sulphuric acid, I normally employ one part $FeCl_3$ to five parts $H_2SO_4$ when treating normal packing house waste having the usual initial pH of about 7.0.

It is well known that ferric chloride is a protein precipitant. It is also well known that the addition of ferric chloride to water increases the hydrogen ion concentration to a relatively greater extent, of course, in dilute solutions, the reaction being $FeCl_3 + 3H_2O \rightleftharpoons Fe(OH)_3 + 3HCl$. Ferric hydroxide being a weak base and hydrochloric acid being a strong acid, the addition of ferric chloride to water increases hydrogen ion concentration.

In a normal waste having a pH of 7.0, I have found that the hydrogen ion concentration is insufficiently increased by the addition of ferric chloride, in reasonable amounts, to render ferric chloride a suitable coagulant for waste treatment without independent adjustment of the pH.

By reason of the reversible character of the reaction between ferric chloride and water, the quantities of ferric chloride which will be necessary to adjust the pH of a waste to the pH employed in the present invention would be prohibitive. It is apparent, therefore, that the mere addition of ferric chloride or any equivalent salt is insufficient to adjust the pH of a waste in the practice of sewage treatment sufficiently to secure a degree of flocculation adequate to reduce the quantity of solids in the effluent to an innocuous point in the case of wastes of the character of packing house wastes relatively high in protein of a particular character.

The practice of the present invention requires adjustment of the pH independently of any effect on hydrogen ion concentration of the coagulating salt.

Having added a sufficient quantity of reagents to the waste, I then thoroughly mix the reagents with the liquid to assure dispersion of the reagents throughout the material, after which the proteins are permitted to flocculate and subsequently settle. The choice of reagents is, to some extent determined by the ultimate disposition of the sludge resulting from the process. The sludge resulting from the process of the present invention has new uses which are more particularly described and claimed in my copending application entitled Sludge treatment, Serial No. 110,008, filed November 9, 1936.

The term "waste" as used in the claims is employed in the sense usual in the sewage treatment art.

I claim:

1. The method of treating packing house wastes which comprises substantially degreasing the waste, adjusting the pH value of the waste to between 4.0 and 5.5, adding to and mixing with the waste an inorganic salt of a metal, having a valence of at least three, flocculating protein constituents of the waste and separating the flocculated material from the resultant effluent.

2. The method of treating packing house wastes which comprises substantially degreasing the waste, adding the sulphate of a polyvalent metal thereto, adjusting the pH value of the waste to between 4.0 and 5.5 by the addition of a mineral acid, admixing the sulphate of a polyvalent metal with the waste, flocculating protein constituents of the waste, and separating the flocculated material from the resultant effluent.

3. The method of treating packing house wastes which comprises substantially degreasing the waste, adding aluminum sulphate thereto, adjusting the pH value of the waste to between 4.0 and 5.5 by the addition of a mineral acid, admixing the aluminum sulphate with the waste, flocculating protein constituents of the waste, and separating the flocculated material from the resultant effluent.

4. The method of treating packing house wastes which comprises substantially degreasing the waste, adding ferric sulphate thereto, adjusting the pH value of the waste to between 4.0 and 5.5 by the addition of a mineral acid, admixing the ferric sulphate with the waste, flocculating protein constituents of the waste, and separating the flocculated material from the resultant effluent.

5. The method of treating packing house wastes which comprises substantially degreasing the waste, adjusting the pH value of the waste to between 4.0 and 5.5, adding to and mixing with the waste ferric chloride, flocculating protein constituents of the waste and separating the flocculated material from the resultant effluent.

6. The method of treating packing house waste water containing protein which comprises precipitating the protein in the waste by the addition of a mineral acid in quantity sufficient to adjust the pH value of the waste to between 4.0 and 5.5, flocculating the precipitated protein by the addition of a protein coagulant, and separating the flocculated material from the effluent.

7. The method of treating packing house waste water containing protein which comprises precipitating the protein in the waste by the addition of a mineral acid in quantity sufficient to adjust the pH value of the waste to between 4.0 and 5.5, and flocculating the precipitated protein by the addition of an inorganic salt of a metal.

8. The method of treating packing house waste water containing protein which comprises precipitating the protein in the waste by the addition of a mineral acid in quantity sufficient to adjust the pH value of the waste to between 4.0 and 5.5, and flocculating the precipitated protein by the addition of a ferric salt.

9. The method of treating packing house waste water containing protein which comprises precipitating the protein in the waste by the addition of a mineral acid in quantity sufficient to adjust the pH value of the waste to between 4.0 and 5.5, and flocculating the precipitated protein by the addition of a soluble ferric salt of an inorganic acid.

10. The method of treating packing house waste water containing protein which comprises precipitating the protein in the waste by the addition of a mineral acid in quantity sufficient to adjust the pH value of the waste to between 4.0 and 5.5, and flocculating the precipitated protein by the addition of ferric chloride.

11. The method of treating packing house waste water containing protein which comprises precipitating the protein in the waste by the addition of a mineral acid in quantities sufficient to adjust the pH value of the waste to between 4.0 and 5.5, and flocculating the precipitated protein by the addition of ferric sulphate.

12. The method of treating packing house waste water containing protein which comprises precipitating the protein in the waste by the addition of a mineral acid in quantities sufficient to adjust the pH value of the waste to between 4.0 and 5.5, and flocculating the precipitated protein by the addition of aluminum sulphate.

13. The method of treating packing house waste water containing protein which comprises precipitating the protein in the waste by the addition of sulphuric acid in quantities sufficient to adjust the pH value of the waste to about 4.8, flocculating the precipitated protein by the addition of ferric sulphate and separating the flocculated material from the effluent.

MARION D. SANDERS.